United States Patent [19]

Cope

[11] Patent Number: 5,334,632
[45] Date of Patent: * Aug. 2, 1994

[54] WATER-REDUCIBLE COATING COMPOSITION AND PROCESS OF USE THEREOF

[75] Inventor: Carroll W. Cope, Marion, Va.

[73] Assignee: Marley Mouldings Inc., Marion, Va.

[*] Notice: The portion of the term of this patent subsequent to Feb. 18, 2009 has been disclaimed.

[21] Appl. No.: 12,707

[22] Filed: Feb. 3, 1993

Related U.S. Application Data

[62] Division of Ser. No. 586,457, Sep. 21, 1990, Pat. No. 5,198,481, which is a division of Ser. No. 285,519, Dec. 15, 1988, Pat. No. 4,980,402.

[51] Int. Cl.$^5$ .................. C08K 11/00; C09D 11/02; B05D 5/00
[52] U.S. Cl. ........................... 524/9; 524/15; 523/160; 427/262; 427/267; 428/151
[58] Field of Search ............... 524/9, 15; 523/160; 427/262, 267; 428/151

[56] References Cited

U.S. PATENT DOCUMENTS

| | | | |
|---|---|---|---|
| 3,639,653 | 7/1972 | Clark et al. | 524/407 |
| 4,546,133 | 10/1985 | Cope | 524/15 |
| 4,638,022 | 1/1987 | Cope | 524/15 |
| 4,921,891 | 5/1990 | Cope | 524/15 |
| 4,980,402 | 12/1990 | Cope | 524/9 |
| 5,089,313 | 2/1992 | Cope | 524/15 |
| 5,198,481 | 3/1993 | Cope | 524/9 |

*Primary Examiner*—John Kight, III
*Assistant Examiner*—Patricia Hampton-Hightower
*Attorney, Agent, or Firm*—Heller, Ehrman, White & McAuliffe

[57] ABSTRACT

Compositions and a method are provided for forming a coated wood, plastic or metal product having the appearance and texture of wood grain. The joints on a wood surface are concealed by the coating and the coating is capable of accepting conventional wood stain.

3 Claims, No Drawings

WATER-REDUCIBLE COATING COMPOSITION AND PROCESS OF USE THEREOF

This is a division of application Ser. No. 07/586,457 filed Sep. 21, 1990, now U.S. Pat. No. 5,198,481, which is a division of application Ser. No. 07/285,519 filed Dec. 15, 1988, U.S. Pat. No. 4,980,402.

The present invention is directed to a method and compositions used therewith for coating wood, metal or plastic to render it capable of receiving wood-grain printing inks and conventional wood stains, while also concealing joints and other imperfections.

In the decorative uses of wood, there are many applications in which visible joints in the wood are not desired. For example, in the use of moldings along the edges of doors, window frames, and the like, it is desirable to have each edge constructed of a single length of wood. Moreover, to have a decorative effect, the wood is often stained to a desired color, such as walnut, rosewood, and the like, then covered with a protective coating such as varnish or other conventional clear coating. The use of single lengths of wood is expensive and wasteful, since short lengths of scrap wood are not reusable. There is no practical alternative to using single lengths of wood for molding. Plastics or compounded wood pulp products are usually not desirable since they either do not have sufficient strength and durability or do not have the pleasing wood grain surface texture. A piece of plywood would also be extremely expensive since one or more surfaces of the molding would have to be veneered, making it much more expensive then a solid piece of wood.

The use of scrap pieces of wood joined together, such as by finger joints, would be desirable. There has been difficulty however, in treating joined pieces of wood to have the appearance of a single piece of wood for decorative purposes. One such method is described in commonly assigned U.S. Pat. No. 4,546,133, wherein specialized wood coating and ink compositions are disclosed. The present invention provides an improved method and coating for metal or plastic to impart wood-like appearance, or for concealing joints in wood, while still maintaining the appearance and texture of a single piece of wood. The coating according to the present invention also is capable of accepting conventional wood stains.

It is therefore an object of the present invention to provide water-reducible compositions which are useful for coating metal or plastic to impart a wood-like appearance, or for coating wood to conceal joints, but which retain the grainy appearance of the natural wood.

It is a further object of the present invention to provide novel coatings for metal, plastic or wood which accept conventional wood stains.

These and other objects will be apparent from the following description and preferred embodiments.

The present method utilizes a basecoat composition for covering plastic, metal, wood or a wood product comprising a combination of resins, pigments, solvents, and additives for suspension, dispersion, thickening, flowing and defoaming. A printing composition is also provided comprising resins, pigments, solvents, and anti-foaming and wetting agents.

The method according to the present invention comprises the steps of applying a novel liquid basecoat onto metal, plastic, natural wood or a wood product, evaporating volatile solvents to form a solid coating, and applying a novel ink composition in a wood grain pattern onto the solid coating.

The starting material for forming a coated product according to the present invention may be any product having a plastic, metal or wood surface, including strips, with or without joints, sheets, including plywood and wood grain paper, or any other product derived from wood or wood pulp, sawdust, and the like. Since a primary purpose for the use of the compositions according to the present invention is to provide a decorative surface, it is desirable, but not necessary, that the starting material have a wood grain texture, since that texture will be substantially retained after the basecoat coating is applied according to the present invention.

Generally, the metal, plastic, wood or wood product will be coated with a liquid basecoat composition according to the present invention then dried to remove the volatile solvents. The drying is preferably performed with heat in a conventional oven, but other evaporative methods may be utilized. Then a grain ink formulation may be applied in a pattern to simulate a wood grain using a conventional roller having a wood grain pattern using the inks described herein. Apparatus for performing these functions are conventional and known in the art.

The basecoat formulation according to the present invention comprises the following components: acrylic resins, styrene-maleic anhydride resins, pigments and fillers, thickener, flow agents, defoaming agents and solvents.

In general, the water-reducible basecoat, according to the invention will contain the following:

|  | % by volume |
| --- | --- |
| Water | 20–30 |
| Organic solvents | 1–5 |
| Styrene-maleic anhydride resins | 0.5–3 |
| Acrylic resins | 45–55 |
| Pigments and inorganic fillers | 10–20 |
| Organic thickener | up to 1 |
| Defoaming agents | up to 3 |
| Flow agents | up to 5 |
| Suspension agent | up to 1 |
| Nut shell flour | 1–5 |

A particularly preferred basecoat composition useful for coating wood contains the following (percentages given by volume).

|  | % by volume |
| --- | --- |
| Water | 23.50 |
| Organic solvents | 1.72 |
| Styrene-maleic anhydride resins | 0.8 |
| Acrylic resins | 51.10 |
| Pigments and inorganic fillers | 15.98 |
| Organic thickener | 0.17 |
| Defoaming agents | 1.02 |
| Flow agents | 3.33 |
| Suspension agent | 0.18 |
| Nut shell flour | 2.20 |

In a preferred formulation, the acrylic resins and styrene-maleic anhydride resins are the commercially available resins Joncryl 89 (Johnson & Johnson), Rhoplex AC-507 (Rohm & Haas), and SMA-1440 (Sartomer Company).

Absorption pigments and inert fillers which may be utilized include commercial pigments such as Asbestine 325 (U.S. Mica), titanium dioxide, talc, Hitox (Benilite), and the like. The composition will also contain an organic pigment, pecan shell flour, preferably ground to an average size of about 40 micron.

The base coat composition will also contain suspension agents, thickeners, flow agents and defoaming agents. Suspension agents include Colloid 711 made by Colloid Co. A preferred thickener is Cellosize, made by Union Carbide. Flow agents such as Minusil (P.G.S., Inc.), Super Adit (Nuodex) may be utilized. Defoaming agents such as Surfynol (Air Products) may be used.

Typical organic solvents include dimethyl ethanol, carbitol (diethylene glycol monomethyl ether) methyl ethyl ketone, acetone, MIBK (methyl isobutyl ketone), methyl and ethyl alcohol, ethyl acetate, amyl acetate, and the like. The several portions of any vehicle used in comparing one of the decorative coatings are generally composed of the same basic materials although they may have varied amounts of thinners, solvents, fillers and the like so as to vary their viscosities and other physical properties, but there may be a combination of unrelated resins used on the same panel to provide texture and growth lines.

The pulverized pecan nut shell flour utilized in the base coat composition as an absorption pigment will be in the form of a fine powder, typically grain size of about 35 to 45 microns (preferably 40 average microns).

The particular proportions of the various components used may be generally in the proportions given above. It will be understood however, that various modifications in proportions and components may be utilized without departing from the scope of the present invention.

A particularly preferred coating composition comprises the following:

|  | parts (volume) |
|---|---|
| Water | 24.88 |
| Dimethyl ethanol | 0.19 |
| Carbitol | 1.63 |
| Styrene maleic anhydride resin SMA-144(H) | 0.84 |
| Rhoplex AC-507 acrylic resin | 41.33 |
| Joncryl 86-acrylic resin | 12.75 |
| TiPure R900, titanium dioxide | 0.79 |
| Hitox pigment | 2.17 |
| Asbestine 325 pigment | 10.46 |
| Nytal 300 talc filler | 3.50 |
| Pecan shell flour (40 micron) | 2.33 |
| Cellosize QP-09-H thickener | 0.18 |
| Defoamer 6-475 (Drew Chemical) | 0.23 |
| Surfynol T.G. (Air Products) | 0.85 |
| Minusil 10 flour additive | 3.40 |
| Super Adit flow additive | 0.13 |
| Colloid 711 suspension agent | 0.19 |

In addition to the various pigments mentioned above, the base coat may contain various typical inorganic pigments useful for wood grain such as those iron pigments ranging in color from yellow through red, reddish brown, brown to black, similar to those found in natural wood. These iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black carbon, and white pigments such as titanium dioxide, titanium calcium, zinc oxide, zinc sulfide, antimony oxide, lithopone, etc. Organic pigments may also be utilized such as toluidine red, phthalocyanine blue and green, VanDyke brown, alizarin, madder lake, lythol red, etc.

After applying the base coat, it is dried, for example, in a conventional oven to remove the volatile solvents, thereby forming a hardened base coat. An ink formulation may then be applied to the base coat with a roller having a wood grain pattern. The ink formulation comprises: resins, pigments and fillers, thickeners, defoaming agents, flow agents, suspension agents, solvents, and wax.

The resins utilized in the above ink formulation include acrylic resins such as Joncryl 74, BALAB, UCAR-SCT 100. The pigments include various pigments utilized to simulate wood grain colors, as described above and include specifically yellow 895-000-1801 (Nuodex), burnt umber (I-347), red oxide 895-1003 (Harshaw), Mearlin silk white (an iridescent pigment). As an absorption pigment Phoschek P/30 may be utilized. As a tinting agent a tint paste such as Benzidine yellow (W-1041) may be utilized. A wetting agent such as glycol ether (PM) is used. Various solvents may be utilized such as DMAE (Union Carbide), water and ethylene glycol.

The pigments which are utilized in the ink formulation will depend upon the color of the wood grain desired. The pigments must, of course, impart a color to the ink formulation which is different from the color of the dried base coat in order to provide contrast. Usually, colorants which impart yellow or brown tones to the base coat will be useful. Typically, the base coat, after application of the ink formulation, will be stained with a conventional wood stain, which usually enhances the contrast between the base coat and the ink.

In general, the ink will contain as follows:

|  | % by volume |
|---|---|
| Water | 2–8 |
| Organic solvents | 1–5 |
| Acrylic resins | 30–60 |
| Yellow pigment | 8–12 |
| Brown pigment | 10–20 |
| Red pigment | up to 3 |
| Iridescent white pigment | up to 1 |
| Inert pigment | up to 5 |
| Wetting agent | 2–8 |
| Wax | 5–15 |

A typical ink formulation may comprise the following (parts by volume):

|  |  |  | Manufacturer |
|---|---|---|---|
| Joncryl 74 | 52.24 | Acrylic resin | Johnson & Johnson |
| BALAB 3056A | .73 | Resin (latex) | Witco |
| Ethylene glycol | 2.32 | Solvent | Chem Central |
| DMAE | .58 | Solvent | Union Carbide |
| Tap Water | 5.15 | Solvent |  |
| UCAR SCT100 | 1.20 | Resin (latex) | Union Carbide |
| Glycol Ether PM | 6.41 | Wetting agent | Ashland |
| 895-000-1801 Yellow | 6.22 | Pigment | Nuodex |
| W.1041 Benzidine Yellow | 4.90 | Tint paste | Harshaw |
| I.347 Bt. Umber | 16.77 | Pigment | Harshaw |
| 895-1003 Red Oxide | .79 | Pigment | Nuodex |
| Mearline Silk White | .22 | Iridescent pigment | Mearl |
| Phos Chek P/30 fine | 2.45 | Absorption pigment | Monsanto |
| Slip Ayd-459-1029 | 10.00 | Wax |  |

After application of the graining ink formulation and air drying, the final product may be utilized as is, or stained with a conventional wood stain, then coated with a conventional varnish or other clear preservative.

The base coat and ink formulation may be applied to any metal, plastic or wood surface, including paper, if desired.

Having described the specific embodiments of the invention, other modifications and variations will be apparent to those of ordinary skill in the art, which variations and modifications are intended to be within the scope of the present invention.

What is claimed is:

1. A printing composition comprising:

|  | % by volume |
|---|---|
| Water | 2–8 |
| Organic solvents | 1–5 |
| Acrylic resins | 30–60 |
| Yellow pigment | 8–12 |
| Brown pigment | 10–20 |
| Red pigment | up to 3 |
| Iridescent white pigment | up to 1 |
| Inert pigment | up to 5 |
| Wetting agent | 2–8 |
| Wax | 5–15 |

2. A printing composition according to claim 1 comprising:

|  | PARTS (VOL) |
|---|---|
| Acrylic resin | 54.17 |
| Ethylene glycol | 2.32 |
| DMAE | .58 |
| Water | 5.15 |
| Wetting agent | 6.41 |
| Yellow pigment | 6.22 |
| Yellow tint | 4.90 |
| Burnt umber pigment | 16.77 |
| Red oxide pigment | .79 |
| Iridescent pigment | .22 |

-continued

|  | PARTS (VOL) |
|---|---|
| Absorption pigment | 2.45 |
| Wax | 10.00 |

3. A method for forming a coated product characterized by a printed wood grain pattern, comprising the steps of:

(a) applying a liquid coating onto a wood, plastic or metal product, said coating comprising

|  | % by volume |
|---|---|
| Water | 20–30 |
| Organic solvents | 1–5 |
| Styrene-maleic anhydride resins | 0.5–3 |
| Acrylic resins | 45–55 |
| Pigments and inorganic fillers | 10–20 |
| Organic thickener | up to 1 |
| Defoaming agents | up to 3 |
| Flow agents | up to 5 |
| Suspension agent | up to 1 |
| Nut shell flour | 1–5 |

(b) evaporating volatile solvents to form a solid coating;

(c) applying an ink composition in a wood grain pattern onto said solid coating, said ink composition comprising

|  | % by volume |
|---|---|
| Water | 2–8 |
| Organic solvents | 1–5 |
| Acrylic resins | 30–60 |
| Yellow pigment | 8–12 |
| Brown pigment | 10–20 |
| Red pigment | up to 3 |
| Iridescent white pigment | up to 1 |
| Inert pigment | up to 5 |
| Wetting agent | 2–8 |
| Wax | 5–15 |

* * * * *